United States Patent [19]
Uken

[11] Patent Number: 4,786,019
[45] Date of Patent: Nov. 22, 1988

[54] ENERGY EFFICIENT SOLID PROPELLANT ATTITUDE CONTROL SYSTEM

[75] Inventor: Arthur H. Uken, Brigham City, Utah
[73] Assignee: Morton Thiokol, Inc., Chicago, Ill.
[21] Appl. No.: 927,290
[22] Filed: Nov. 4, 1986

Related U.S. Application Data

[63] Continuation of Ser. No. 731,703, May 8, 1985, abandoned.
[51] Int. Cl.$^4$ ............................ B64G 1/26; B64G 1/42
[52] U.S. Cl. ....................................... 244/169; 290/52; 60/39.07; 60/39.33; 60/39.43
[58] Field of Search ................. 244/164, 169, 172, 52, 244/322; 60/39.07, 39.33, 39.43, 253, 259, 203, 246, 232; 290/52

[56] References Cited

U.S. PATENT DOCUMENTS

| | | | |
|---|---|---|---|
| 2,965,334 | 12/1960 | McCullough, Jr. et al. | 244/169 |
| 2,995,319 | 8/1961 | Kershner et al. | 244/52 |
| 3,508,070 | 4/1970 | Barish et al. | 290/52 |
| 3,528,245 | 9/1970 | Sitney | 60/203 |
| 3,770,062 | 11/1973 | Riggs | 239/587 |
| 3,776,265 | 12/1973 | O'Connor, Jr. | 290/52 |
| 3,788,069 | 1/1974 | Schmidt | 60/246 |
| 4,193,259 | 3/1980 | Muenger | 60/39.12 |
| 4,273,304 | 6/1981 | Frosch et al. | 60/259 |
| 4,550,888 | 11/1985 | Douglass et al. | 244/169 |

OTHER PUBLICATIONS

Layton, "Reactor/Broyton Power Sys. for Nuclear Ele. Spacecraft", Confer. Energy to the 21st Century, 15th Intersoc. Energy Conversion Engr. Confr., Seattle, WA, 18–22 Aug. 1980.
Macie et al., "Power Processing Requir. for Solar Elec. Prgs.", Power Conditioning Specialists Confr., 19–20 Apr. 1971.

Primary Examiner—Galen Barefoot
Attorney, Agent, or Firm—Gerald K. White

[57] ABSTRACT

An energy efficient solid propellant attitude control system for use on post boost vehicles equipped with post boost control systems, post boost propulsion systems, and velocity control systems utilizes gas from a gas generator to drive a gas turbine which drives an alternator to produce electrical power. The turbine effluent gas is selectively directed to highly vectorable hinged nozzles to provide attitude control for the post boost vehicle. Power from the alternator is used to drive electromechanical actuators which orient the highly vectorable hinged nozzles. The turbine effluent gas is also selectively directed to fixed thrusters and twin axial thrust motors.

3 Claims, 5 Drawing Sheets

ENERGY EFFICIENT SOLID PROPELLANT ATTITUDE CONTROL SYSTEM

This is a continuation of co-pending application Ser. No. 06/731,703 filed on May 8, 1985, now abandoned.

BACKGROUND OF THE INVENTION

1. Field of the Invention

This invention relates to improvement in attitude control systems for space vehicles, and more particularly, to a solid propellant attitude control system for post boost space vehicles.

2. Description of the Prior Art

In the prior art attitude control systems for affecting the various motions of post boost space vehicles, as is disclosed, for example, in U.S. Pat. No. 3,231,223 issued to C. E. Upper on Jan. 25, 1966, in U.S. Pat. No. 3,826,087 issued to Allan J. McDonald on July 30, 1974, and in application for U.S. Patent bearing Ser. No. 642,469, filed on Aug. 20, 1984 by Allan J. McDonald, the practice is to direct gas generated by a gas generator to fixed nozzles without first extracting surplus energy from the gas stream. Fixed nozzles, typically called thrusters, or fixed rocket engines are utilized for providing orientation forces in post boost vehicles. Multiple individual thrusters or rocket engines are needed to obtain the various pitch, yaw, roll, translational and axial motions desired. The use of fixed nozzles requires many nozzles to achieve maximum moment arm lengths for torque forces on the post boost vehicle. If fewer nozzles are used, higher thrust nozzles are needed in order to obtain the required thrust forces. As a result, the prior art solid propellant attitude control systems leave much to be desired from the standpoint of being energy efficient.

There is, accordingly, a need and a demand for an energy efficient solid propellant attitude control system for post boost space vehicles.

SUMMARY OF THE INVENTION

An object of the invention is to provide an energy efficient solid propellant attitude control system for use on post boost space vehicles.

Another object of the invention is to provide such an energy efficient solid propellant control system that requires fewer nozzles and less gas flow to obtain pitch, yaw, roll, translational, and axial motions.

Still another object of the invention is to provide such an energy efficient control system that utilizes highly vectorable hinged nozzles.

A further object of the invention is to provide such an energy efficient control system wherein surplus energy is extracted from the gas flow stream before the latter is directed to the highly vectorable hinged nozzles, the surplus energy being converted to electrical and/or hydraulic power that may be used to drive actuators for orienting the highly vectorable hinged nozzles, or to provide power for general service.

In accomplishing these and other objectives of the invention, a flow of gas from a solid propellant gas generator drives a gas turbine which drives an alternator to produce electrical power. The turbine effluent gas is directed to a plurality of highly vectorable hinged nozzles to provide attitude control for the post boost vehicle, and may also be used to provide axial thrust for the post boost vehicle. Electrical power from the alternator may be used to drive electromechanical actuators for orienting the highly vectorable hinged nozzles. The gas turbine may be used, also, to drive a hydraulic pump or mechanical actuators to provide power for orienting the highly vectorable hinged nozzles, or to provide hydraulic power for general service.

The various features of novelty which characterize the invention are pointed out with particularly in the claims annexed to and forming a part of this specification. For a better understanding of the invention, its operating advantages, and specific objects attained by its uses, reference is made to the accompanying drawings and descriptive matter in which a preferred embodiment of the invention is illustrated.

DESCRIPTION OF THE PRIOR ART SOLID PROPELLANT CONTROL SYSTEM

Figure 1:
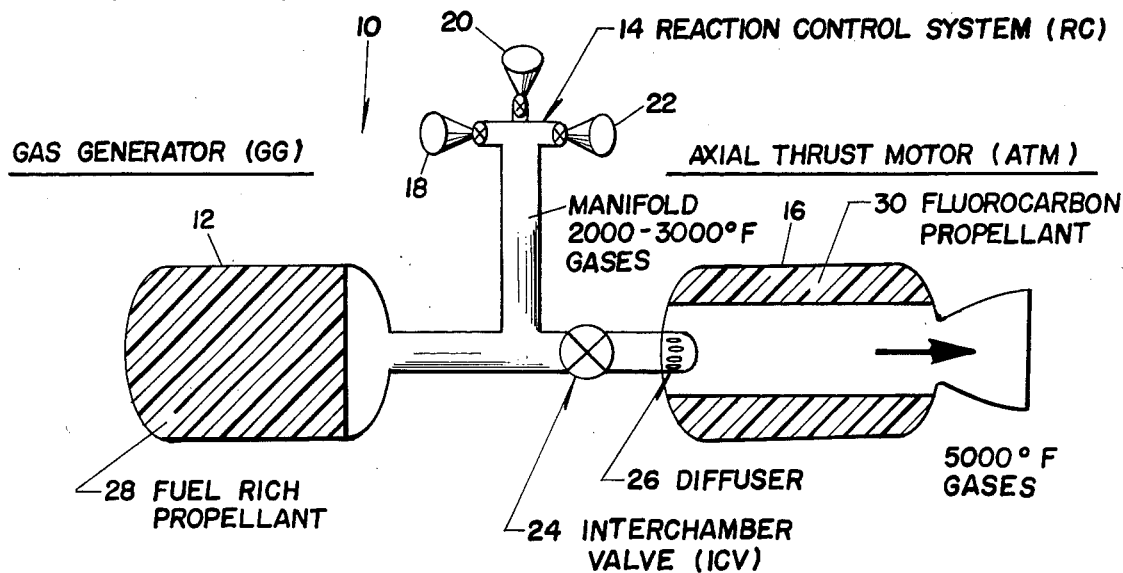
FIG. 1 is a schematic illustration of a prior art solid propellant combustion system including an extinguishable axial thrust motor and fixed thrusters for effecting attitude control.

The prior art solid propellant combustion system, indicated at 10 in FIG. 1, comprises a dual chamber, multiple propellant, rocket motor. The solid propellant combustion system 10 includes a gas generator 12, which, once ignited, may burn continuously to supply hot propulsive gas to either an attitude or reaction control system, indicated at 14, for space vehicle orientation, or to an extinguishable axial thrust motor 16.

For convenience of illustration, the attitude control system 14 is shown as having only three fixed thrusters to which reference numerals 18, 20 and 22 have been applied. In practice at least four such thrusters would be employed, with two thrusters facing away from each other in the plane of the drawing and two thrusters facing away from each other in a plane positioned at an angle of 90° with respect to the plane of the paper.

The axial thrust motor 16 is ignited when an interchamber valve, designated 24, is opened to allow generated gas from gas generator 12 to enter the axial thrust motor through a diffuser 26. Diffuser 26 is positioned at the forward or head end of the motor 16. Multiple igniters, not shown, may be used to assist ignition. Shutting off or closing the interchamber valve 24 results in extinguishment of the axial thrust motor 16.

The gas generator 12 uses a fuel rich nonmetallized propellant grain 28 while the axial thrust motor 16 uses an oxygen rich nonmetallized fluorocarbon propellant grain 30. The propellant grain 30 is selected such that, when mixed with gas from generator 12, it provides high specific impulse (approximately 300 sec. $I_{SP}$ being theoretically possible). Propellant grain 30 is capable of extinguishment upon termination of the flow of gas from generator 12. Fluorocarbon propellants are unique in this regard.

DESCRIPTION OF THE PREFERRED EMBODIMENT

Figure 2:
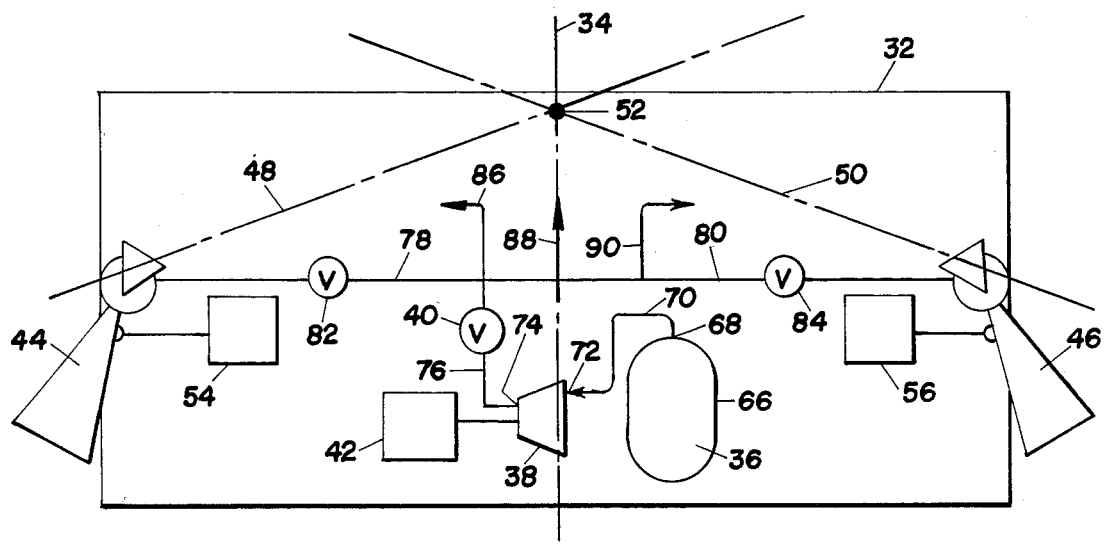
FIG. 2 is a schematic illustration of the invention.
Figure 3:
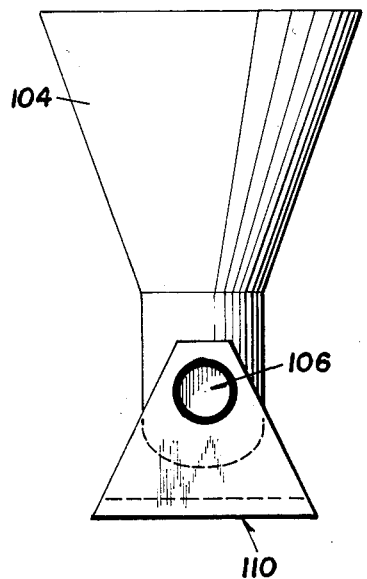
FIGS. 3 and 4 are side and front views, respectively, of a highly vectorable hinged nozzle that advantageously is employed in the embodiment of FIG. 2.

Referring to FIG. 2 of the drawings, the reference numeral 32 designates a post boost vehicle. Post boost vehicle 32 effects relative motion along the longitudinal axis thereof, indicated at 34. Contained within the post boost vehicle 32 is a solid propellant gas generator 36, a gas turbine 38, a gas flow control valve 40, and an alternator 42. Mounted on the aft end of the vehicle 32, as shown in FIG. 2, are two highly vectorable hinged nozzles 44 and 46 for providing attitude control for the post boost vehicle 32. Highly vectorable hinged nozzle 44 allows thrust vectorability in excess of 90° in either direction from a moment arm axis, indicated at 48, of the vehicle 32. Similarly, highly vectorable hinged nozzle 46 allows thrust vectorability in excess of 90° in either direction from a moment arm axis, indicated at 50. The moment arm axes 48 and 50, in each case, is the straight line between the axis of the respective associated highly vectorable hinged nozzle 44 and 46 and the center of gravity, indicated at 52, of the post boost vehicle 32. An electromechanical actuator 54 is provided for adjusting the orientation of the nozzle 44. Similarly, an electromechanical actuator 56 is provided for adjusting the orientation of the nozzle 46.

Figure 6:
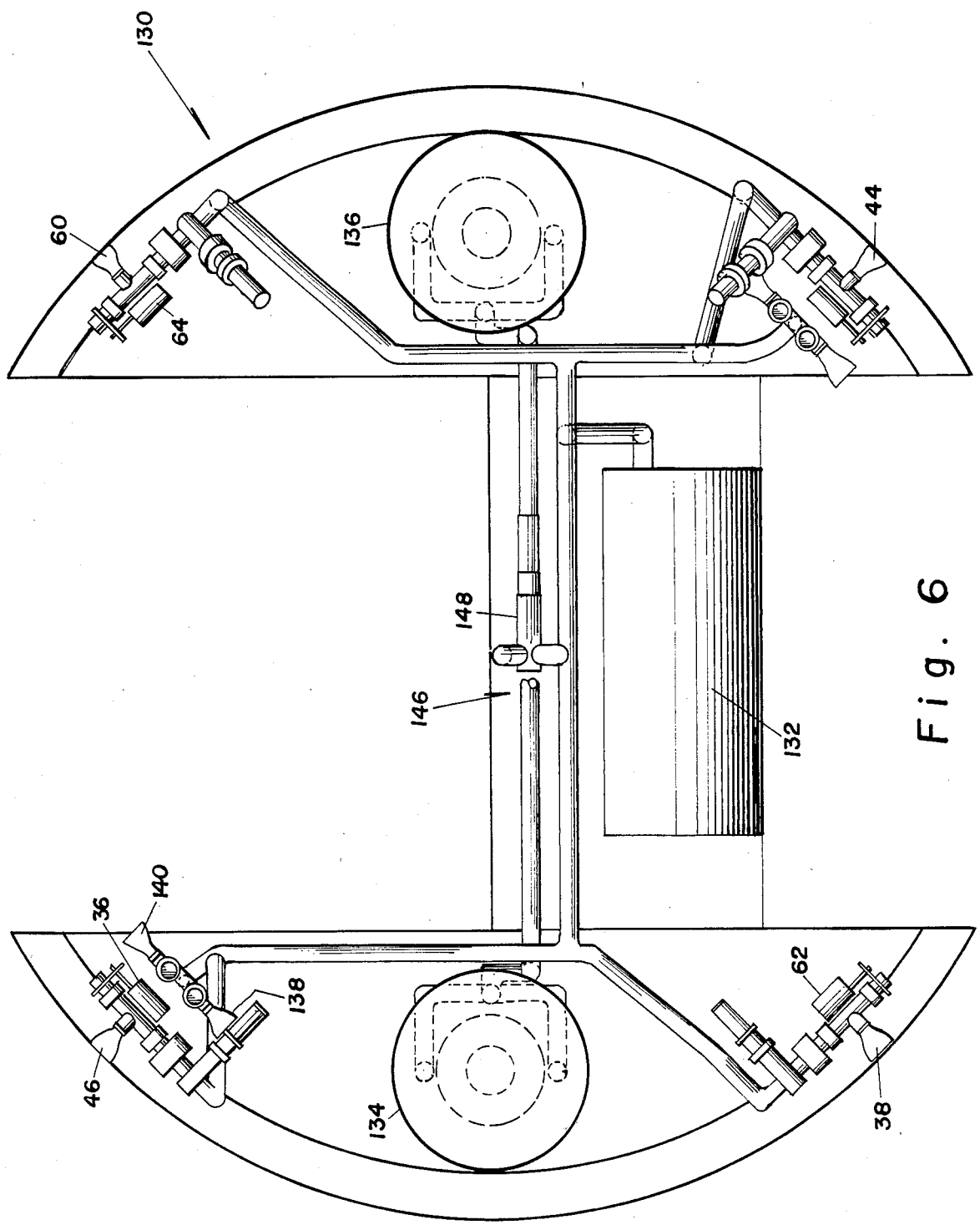
FIGS. 6, 7 and 8 are top, side and perspective views, respectively, of a staged solid propellant combustion system embodying the invention.
Figure 8:
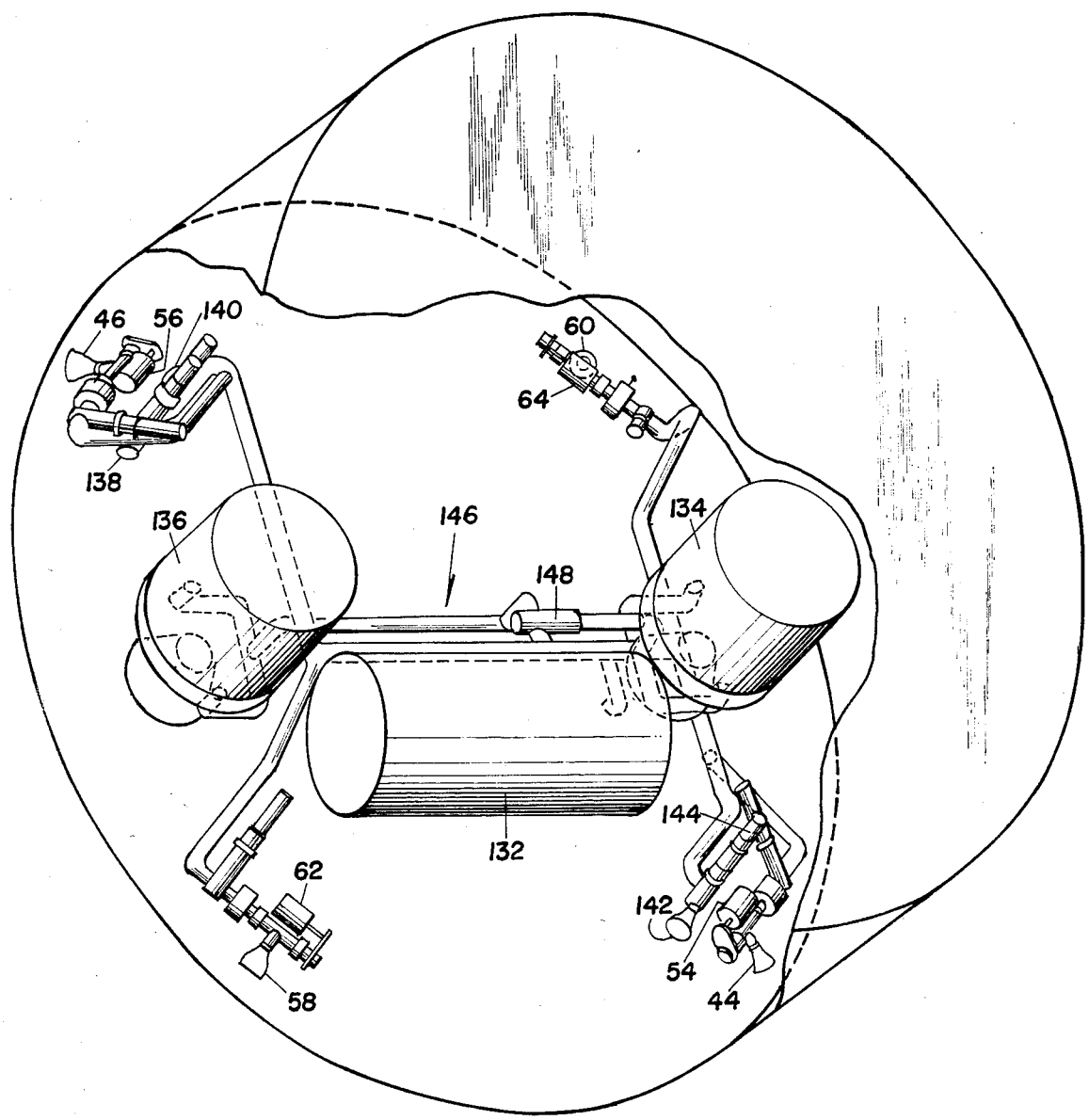

There is provided, in accordance with the invention, two additional highly vectorable hinged nozzles. These highly vectorable hinged nozzles are not shown in FIG. 2, one being positioned above and the other below the plane of the drawing. Each of these additional nozzles has a moment arm axis that passes through the center of gravity 52 of the vehicle 32, and is provided with an individually associated electromechanical actuator for adjusting the orientation thereof. These additional highly vectorable hinged nozzles are shown in FIGS. 6 and 8, being designated by reference numerals 58 and 60. Electromechanical actuators 62 and 64 are respectively associated with the nozzles 58 and 60 for adjusting the orientation thereof.

The solid propellant gas generator 36 may be of a conventional type including a propellant grain (not shown) and having a multiple igniter (not shown). The propellant grain may comprise a propellant having a combustion temperature in the range of 2000° F. to 3000° F. A typical gas generator propellant that may be employed is HTPB/HMX gas generator propellant. The gas generator grain is formed or cast within a casing 66 which includes an exit opening 68 for gaseous exhaust from the gas generator 36 during combustion of the propellant grain.

Figure 7:
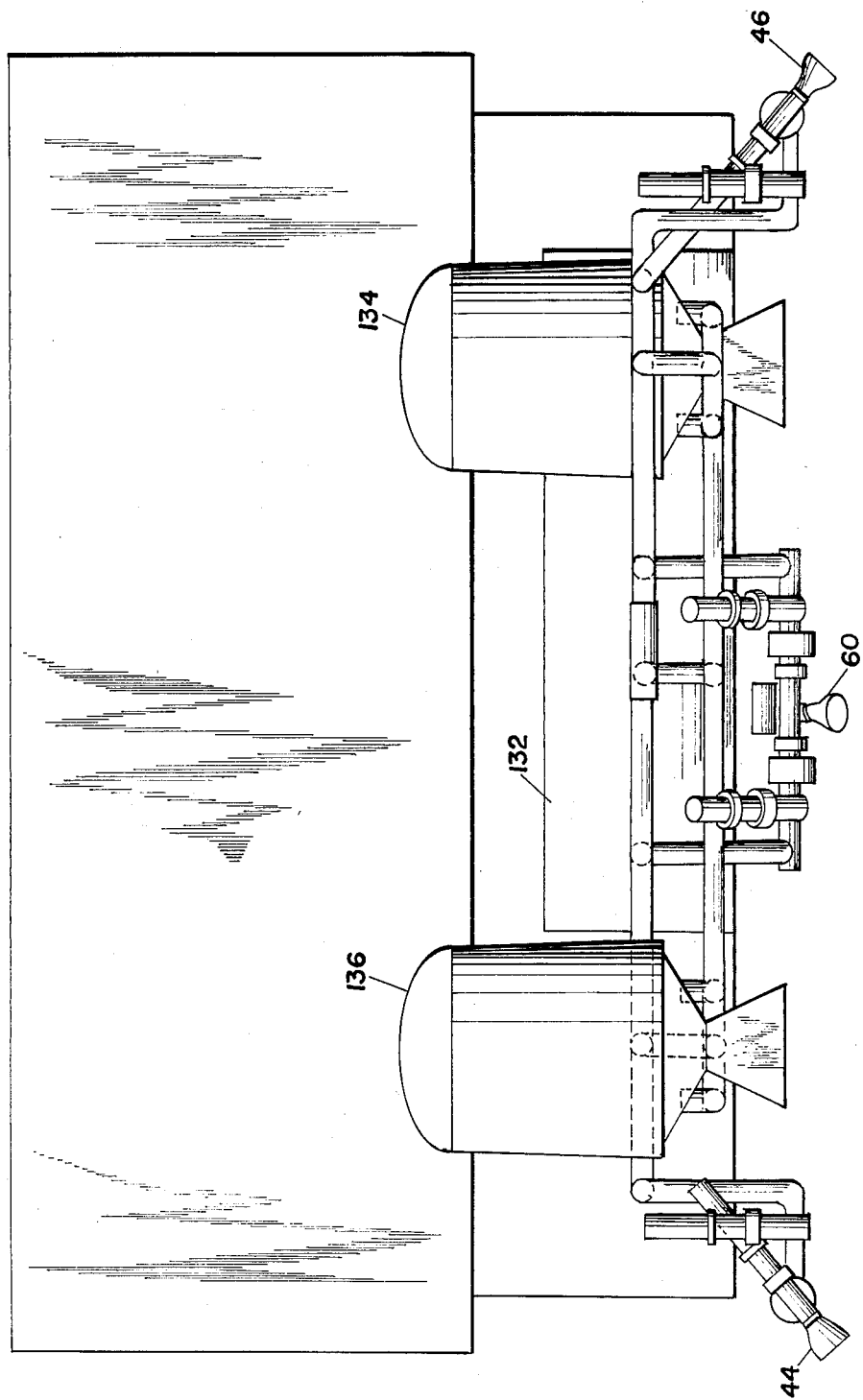

Generated gas from generator 36 flows through a first conduit 70 to an inlet 72 of the gas turbine 38. Turbine 38 may be of a conventional type, including a turbine wheel (not shown), and has an effluent gas exit opening 74. Gas flows from exit opening 74 through a second conduit 76 and gas control valve 40 to the highly vectorable hinged nozzles 44, 46, 58 and 60 for controlling the attitude of the post boost vehicle 32. Such control is effected by selectively venting the turbine effluent gas to the environment through the nozzles 44, 46, 58 and 60. The gas flow path to the nozzle 44 includes a third conduit 78, and that to the nozzle 46 includes a fourth conduit 80. A gas flow control valve 82 is located in conduit 78 for controlling the turbine effluent gas stream to the nozzle 44. Similarly, a flow control valve 84 is located in the conduit 80 for controlling the turbine effluent gas stream to the nozzle 46. Fifth, sixth and seventh conduits 86, 88 and 90 are also provided, as shown in FIG. 1, for conducting the effluent gas of turbine 38 from gas control valve 40 to other valves and nozzles, as shown in FIGS. 6-8, for providing other service on the post boost vehicle 32. It will be understood that additional such conduits may be provided, as required.

Figure 5:
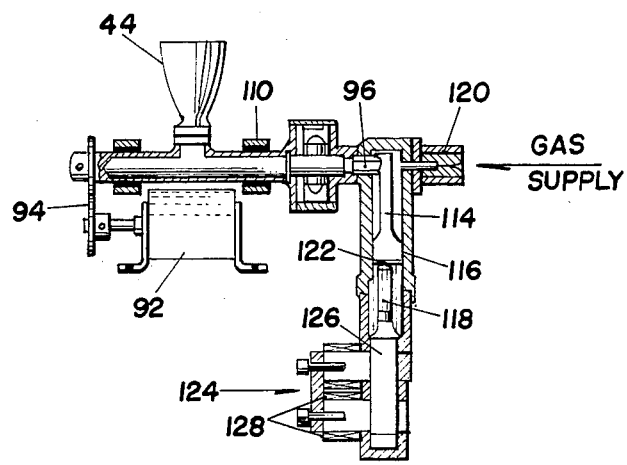
FIG. 5 is a detailed illustration of an electromechanical actuator for actuating the highly vectorable hinged nozzle.

Turbine 38 drives alternator 42 to provide electrical power that may be used to drive the electromechanical actuators 54, 56, 62 and 64. The electromechanical actuators may be of conventional type. Each electromechanical actuator includes, as shown in FIG. 5, an electrical motor 92 that is suitably mounted on the post boost vehicle 32 and is connected to its associated nozzle by a suitable gear arrangement indicated at 94. The circuitry for energizing motor 92 may include suitable follow up and feedback circuit elements for facilitating the adjustment in the orientation of the associated highly vectorable hinged nozzle. The detailed construction of the actuators, gear arrangement 94, and of the electrical circuitry for controlling the motor 92, and for coordinating the activation of each actuator with the actuation of the valve to deliver gas to the associated nozzle, form no part of the present invention, and hence, is not further described herein.

Figure 4:
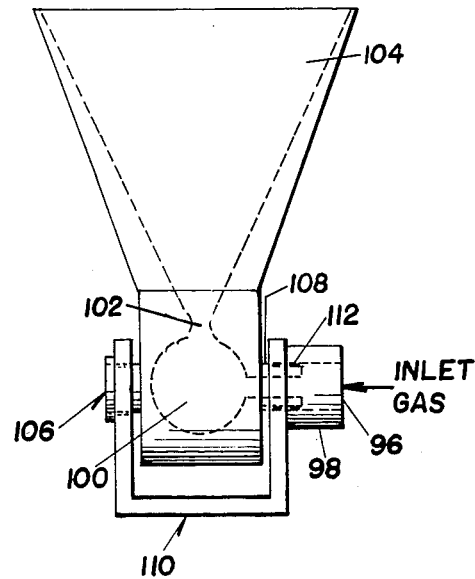

As best seen in FIGS. 4 and 5, the highly vectorable hinged nozzles 44, 46, 58 and 60 feature a side inlet 96 that is formed in a fitting 98 for a gas flow stream to allow a wide range of thrust vectorability. Each of the nozzles 44, 46, 58 and 60 may be of the converging-diverging type having an inlet chamber 100, a throat 102, and an exit cone 104. Each of the nozzles 44, 46, 58 and 60 also includes externally mounted opposed cylindrical shafts or posts 106 and 108, which are fixedly attached to the nozzle, and may, if desired, be integrally formed therewith. Posts 106 and 108 are so located that the centerline of one or both posts 106 and 108 can be drilled out to admit a gas flow stream into the chamber 102 of the nozzle. The posts 106 and 108 are restrained, being arranged for pivotal movement, in a mounting bracket 110 by means of a journal, roller or ball bearings (not shown). Gas inlet 96 is affixed to the mounting bracket 110 by fitting 98 in such a manner that gas is directed into the nozzle inlet chamber 100 without leaking at the mounting bracket interface, leaking between the gas inlet 96 and the mounting post 110 being prevented by a suitable leak seal 112.

With this arrangement, gas flow into a sealed, rotatable hollow shaft of each of the nozzles 44, 46, 58 and 60 effectively is provided. Each of the nozzles, as mentioned hereinbefore, allows thrust vectorability in excess of ±90° for a gas stream. This enables a single nozzle to replace two or more of the fixed nozzles or thrusters that are employed in the prior art attitude control systems for post boost space vehicles. Additionally, there is eliminated the need for scarfed nozzles that are typically used in prior art post boost propulsion systems.

The highly vectorable hinged nozzles are further characterized in that the thrust forces react into a mounting bracket, specifically mounting bracket 110. This allows each of the nozzles to be positioned within the exterior boundary of the post boost vehicle 32 during the boost phase.

As those skilled in the art will understand, each of the nozzles 44, 46, 58 and 60 which utilize a side inlet 96 to achieve high thrust vectorability, can be adapted for use with a liquid propellant stream in place of a gas stream, if desired.

The flow control valves 40, 82 and 84 and those connected in conduits 86, 88 and 90 are hot gas valves and may use flappers having only open/closed, or on/off, positions. Pressure of the hot gas effluent from turbine 30 is used to seat, that is to move the flapper to the off or closed position. Energization of an electromagnet is used to unseat the flapper to allow gas flow.

Specifically, as shown in FIG. 5, inlet gas to the side inlet 96 of the highly vectorable hinged nozzle, for purposes of illustration designated nozzle 44, is controlled by a pivoted flapper 114. Flapper 114 is positioned within a tubular enclosure 116 and is pivoted at a region intermediate the ends thereof on a flexure 118. A supply of gas enters the upper end of enclosure 116 through an inlet venturi indicated at 120. A barrier 122 that is located immediately above flexure 118 provides a seal against gas flow out of the lower end of tubular enclosure 116. Associated with the lower end of enclosure 116 and the lower end of flapper 114 is an electromagnet 124 having an armature 126 and a coil 128.

With coil 128 in a deenergized state, flapper 114 is urged for rotation in a counterclockwise direction, as seen in the drawing, by the pressure of the gas applied through inlet venturi 120. This maintains the flapper 114 in a seated or closing relation with the inlet 96 of nozzle 44. When the coil 128 of the electromagnet 124 is energized, the flapper 114 is unseated, that is rotated clockwise through a small angle out of engagement with the inlet 96 of nozzle 44. This allows gas from the turbine effluent outlet 74 to flow through nozzle 44 for adjusting the orientation of the post boost propulsion vehicle 32. Upon deenergization of electromagnet 124, the flapper 114 again is forced by the pressure of the gas to close the inlet 96 of nozzle 44, thereby shutting off the flow of gas.

In FIG. 6 there is shown a dual chamber solid post boost propulsion system 130 in which the energy efficient solid propellant attitude control system, as shown in FIG. 2, of the present invention is embodied. Thus, incorporated in the system of FIG. 6 is a housing 132 containing a gas generator, a gas turbine and an alternator, none of which are shown in FIG. 6 but which may be similar or identical to the components 36, 38 and 42 of FIG. 2. The system of FIG. 6 further includes two axial thrust motors 134 and 136, four fixed roll thrusters 138, 140, 142 and 144, four highly vectorable hinged pitch/yaw nozzles 44, 46, 58 and 60, a manifold system 146, and an interchamber valve 148. Additional views of the dual chamber solid post boost propulsion system 130 are shown in FIGS. 7 and 8, FIG. 7 being a side view and FIG. 8 a perspective view as seen from a position forward of and below the system 130.

Each of the fixed thrusters 138-144 may be provided with an electromagnetically actuated flapper of the type shown and described in connection with FIG. 5, for allowing or preventing the flow of generated gas therethrough. Also, each of the vectorable hinged nozzles 44, 46, 58 and 60 is shown in FIGS. 6 and 8 as being provided with an individually associated electromechanical actuator for adjusting the orientation thereof and thereby the attitude of the vehicle being deployed by the post boost propulsion system. As previously mentioned, these electromechanical actuators, designated by reference numerals 54, 56, 62 and 64 in FIGS. 6-8, may all be of the type shown and described in connection with FIG. 5.

The gas generator 132 is a dual level gas generator that may be arranged to operate at 700 pounds per square inch absolute (psia) to supply gas to the axial thrust motors 134 and 136 and at 350 psia to the thrusters 138-144 and vectorable nozzles 44, 46, 58 and 60. At the low operating pressure, flow is sufficient to supply any two of the thrusters or nozzles simultaneously. If no attitude correction motions are required, the generated gas is vented by pulsing opposing roll thrusters. Force vectors from opposing roll thrusters must cancel during gas venting. The vectorable pitch/yaw nozzles provide plus or minus pitch or yaw, backaway, translate, and forward velocity correction.

For large axial velocity changes, the axial thrust motors 134 and 136 are ignited. This is accomplished by closing all of the thruster valves, which increases the gas generator pressure. At 700 psia, the interchamber valve 148 is opened to allow generated gases into the axial thrust motors. The throat of valve 148 is sized so as to maintain gas pressure at 700 psia. To assure matched ignition and minimum ignition delay, an axial thrust motor igniter arrangement including multiple igniters (not shown) is also fired. Additionally, as shown in FIGS. 6-8, manifold lengths from the interchamber valve 148 to the axial thrust motors are equal. Thus, gas generator gas flow imbalances are eliminated.

Axial thrust motor extinguishment is achieved by closing the interchamber valve 148. This results in a rapid drop in axial thrust motor chamber pressure that quickly extinguishes the propellant, a fluorocarbon solid propellant, used in motors 134 and 136. While this is occurring, a blowdown is conducted by opening all four roll thruster valves 138-144. This drops the gas pressure from 700 psia to 350 psia. Blowdown gas may be used, if desired, for the next attitude orientation maneuver.

While twin axial thrust motors 134 and 136 are used in the dual chamber solid post boost control system illustrated in FIGS. 6-8, those skilled in the art will recognize that, if desired, a single axial thrust motor located on the longitudinal centerline of the space vehicle may be employed. When the two axial thrust motors 134 and 136 are used, it may be useful to cant the motors slightly so that the thrust vectors thereof pass through or are closer to the center of gravity of the space vehicle.

The detailed construction of the axial thrust motors 134 and 136 and of the gas generator, turbine and alternator embodied in housing 132 form no part of the present invention, and therefore, will not further be described herein.

Table 1 gives basic propellant formulation and property data for gas generator and axial thrust motor propellants that may be used. Propellant TP-G3151 is an off-the-shelf gas generant that has relatively high $I_{SP}$ (207 seconds delivered) and high pressure exponent. It has good high pressure burning characteristics and has exceptionally clean burning properties, which minimize the possibility of valve sticking or plugging.

The axial thrust motor propellant is an oxygen rich fluorocarbon formulation. It has a high degree of chemical stability and resists reignition, when extinguished, from radiant heat feedback. Extinguishment occurs when the flow of gas from the gas generator is terminated by shutting the interchamber valve 148.

TABLE 1

| AXIAL THRUST MOTOR | | GAS GENERATOR | |
| --- | --- | --- | --- |
| | WT (%) | | WT (%) |
| TP-F1009S | | TP-G3151 | |
| AP | 84 | HMX | 74 |
| C7 FA BINDER | 16 | POLYETHYLENE | 6 |
| | | POLYGLYCOL BINDER | 20 |
| PROPELLANT PROPERTIES | | | |
| $p(LB/IN.^3)$ | 0.069 | | 0.0565 |
| $r_b$ (IN./SEC) AT 200 PSIA | 0.10 | | 0.025 |
| n | 0.74 | | 0.62 |
| FLAME TEMP (°F.) | 4,800* | | 2,200 |

*MIXTURE RATIO = 3:1, $I_{SP}$ = 275 AT 30:1 - AXIAL MODE

Thus, there has been provided, in accordance with the invention, an energy efficient, solid propellant attitude control system for use on post boost vehicles equipped with post boost control systems, post boost propulsion systems, and velocity control systems. Gas from a gas generator drives a gas turbine which drives an alternator to produce electrical power. The turbine effluent gas is directed to four highly vectorable hinged nozzles to provide attitude control for the post boost vehicle. Electrical power from the alternator may be used to drive electromechanical actuators which orient the highly vectorable hinged nozzles. The highly vectorable hinged nozzles, in conjunction with four fixed roll thrusters, efficiently deliver all required vehicle motions with a low gas generator gas flow rate. This conserves energy and minimizes gas venting when no vehicle maneuvers are required. Moreover, this unique nozzle and thruster arrangement, teamed with a dual chamber solid propellant post boost propulsion system, provides a high thrust turn down capability.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of the invention be determined by the appended claims and their equivalents.

What is claimed is:

1. An energy efficient solid propellant attitude control system for a post boost space vehicle having an aft end comprising, a solid propellant gas generator for generating a flow of generated gas, a plurality of nozzles mounted on the aft end of the post boost space vehicle for providing attitude control of the post boost space vehicle, means directing said flow of generated gas through said nozzles to the environment to control the attitude of the post boost space vehicle, said nozzles being highly vectorable hinged nozzles having a side gas inlet through which the said flow of generated gas is admitted for flow through said nozzles to the environment, means operative to extract surplus energy from the said flow of generated gas, before the said flow of generated gas is directed through said nozzles, said means to extract energy from the said flow of generated gas comprising a gas turbine, a first conduit connecting said gas generator to said turbine for driving said turbine by the said flow of generated gas, said turbine having an effluent gas exit opening, and an alternator driven by the gas turbine to produce electrical power, and means utilizing such extracted surplus energy to orient said nozzles relative to the post boost space vehicle, wherein said means to direct said flow of generated gas through said nozzles to the environment includes a second conduit connecting the turbine gas effluent exit opening to the side gas inlet of said nozzles, wherein said means utilizing energy that is extracted from said flow of generated gas to orient said nozzles relative to the post boost space vehicle is an electromechanical actuator that is energized by the electrical power produced by said alternator, wherein said post boost space vehicle has a center of gravity and includes a moment arm axis associated with each of said nozzles, all of said moment arm axes passing through the center of gravity of said post boost space vehicle, wherein each of said nozzles is vectorable substantially 90° in either direction from the associated moment arm axis of the post boost space vehicle and includes externally mounted opposed cylindrical posts rigidly formed with said nozzles with at least one of said posts being hollow and forming a side gas inlet of said nozzles, and further including a bracket associated with each of said nozzles in which the opposed posts of the nozzle are mounted for pivotal movement, said bracket being fixedly attached to the aft end of said post boost space vehicle.

2. An energy efficient solid propellant attitude control system for a post boost space vehicle comprising, a solid propellant gas generator for producing a flow of generated gas, said gas generator including a casing having an exit opening for the said flow of generated gas, a gas turbine, said turbine having an exit opening for effluent gas, first conduit means connecting the exit opening of said gas generator casing to said gas turbine for driving said gas turbine with the said flow of generated gas, with effluent gas from said gas turbine exiting therefrom through said gas turbine exit opening, an alternator, said alternator being connected to and driven by said turbine for producing electrical power, a plurality of highly vectorable hinged nozzles each of which have a side gas inlet for providing attitude control for the post boost vehicle, each of said nozzles being connected to and adapted for pivotal movement relative to the post boost vehicle, wherein each of said highly vectorable hinged nozzles is of the convergent divergent type having an inlet chamber, a throat and an expansion cone, includes externally mounted opposed cylindrical posts rigidly formed therewith with at least one of said posts being hollow and forming the side gas inlet of said nozzle, and further includes a bracket in which said opposed posts are mounted for pivotal movement, said bracket being fixedly attached to the post boost vehicle, second conduit means connecting the said exit opening of said gas turbine to the side inlet of each of said nozzles for venting turbine effluent gas to the environment through said nozzles, valve means connected in said second conduit means to selectively control the flow of effluent gas from said turbine through said nozzles, and electromechanical actuator means connected to said nozzles for adjusting the orientation thereof relative to the post boost vehicle, said actuator means being connected to and driven by electrical power produced by said alternator.

3. An energy efficient solid propellant attitude control system for a post boost space vehicle comprising, a solid propellant gas generator for producing a flow of generated gas, said gas generator including a casing having an exit opening for the said flow of generated gas, a gas turbine, said turbine having an exit opening for effluent gas, first conduit means connecting the exit opening of said gas generator casing to said gas turbine for driving said gas turbine with the said flow of generated gas, with effluent gas from said gas turbine exiting therefrom through said gas turbine exit opening, an alternator, said alternator being connected to and driven by said turbine for producing electrical power, a plurality of highly vectorable hinged nozzles each of which have a side gas inlet for providing attitude control for the post boost vehicle, each of said nozzles being connected to and adapted for pivotal movement relative to the post boost vehicle, second conduit means connecting the said exit opening of said gas turbine to the side inlet of each of said nozzles for venting turbine effluent gas to the environment through said nozzles, valve means connected in said second conduit means to selectively control the flow of effluent gas from said turbine through said nozzles, and electromechanical actuator means connected to said nozzles for adjusting the orientation thereof relative to the post boost vehicle, said actuator means being connected to and driven by electrical power produced by said alternator, wherein said valve means includes a pivotable flapper individually associated with the side inlet of each of said nozzles with the pressure of the gas being operative to move said flapper to close said side inlet to prevent the flow of gas therethrough, and further including electromagnetic means which, when energized, is operative to move said flapper away from said side inlet to allow the flow of gas through said nozzle.

* * * * *